United States Patent [19]
Port et al.
[11] Patent Number: 4,574,388
[45] Date of Patent: Mar. 4, 1986

[54] CORE FOR MOLYBDENUM ALLOY X-RAY ANODE SUBSTRATE

[75] Inventors: John H. Port, Solon; Dennis G. Kukoleck, Garfield Heights; Robert M. Guezuraga, Chagrin Falls, all of Ohio

[73] Assignee: General Electric Company, Milwaukee, Wis.

[21] Appl. No.: 613,489

[22] Filed: May 24, 1984

[51] Int. Cl.[4] .................... H01J 35/10; B23K 15/00; B23K 19/00

[52] U.S. Cl. .................... 378/144; 228/194; 378/125

[58] Field of Search .................... 378/144, 125; 228/194

[56] References Cited

U.S. PATENT DOCUMENTS

| | | | |
|---|---|---|---|
| 4,033,504 | 7/1977 | Fletcher et al. | 228/194 |
| 4,195,247 | 3/1980 | Hirsch | 378/144 |
| 4,298,816 | 11/1981 | Hirsch | 378/144 |
| 4,367,556 | 1/1983 | Hübner et al. | 378/144 |

*Primary Examiner*—Alfred E. Smith
*Assistant Examiner*—T. N. Grigsby
*Attorney, Agent, or Firm*—Douglas E. Stoner; Alexander M. Gerasimow

[57] ABSTRACT

An x-ray tube anode formed of a dispersion-strengthened molybdenum alloy which is not compatible with a stem of a different material for purposes of diffusion bonding, includes an integral core insert composed of a substantially pure molybdenum alloy. The insert is compatible with both the adjoining materials and allows for a diffusion bonding of the anode to the stem.

9 Claims, 1 Drawing Figure

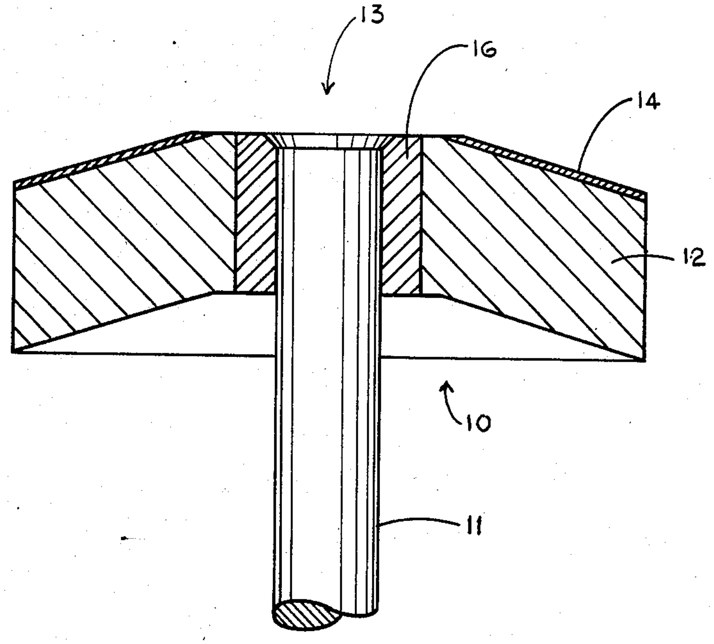
13
16
14
12
10
11

CORE FOR MOLYBDENUM ALLOY X-RAY ANODE SUBSTRATE

BACKGROUND OF THE INVENTION

This invention relates generally to rotating anodes for x-ray tube targets and, more particularly, to a molybdenum alloy substrate for an anode with improved means for attachment to an x-ray tube stem.

In the historical development of a rotating anode for x-ray tubes, manufacturers have progressed from the use of a tungsten substrate material to that of a molybdenum material, and finally to that of a molybdenum alloy material. The pure molybdenum material was found to have a thermal capacity substantially equal to that of tungsten but also offered the attractive advantage of being a relatively low density material which allowed the use of bigger targets. On the negative side, however, it was found to be susceptible to thermal creep which caused eventual warpage of the target. This problem was initially addressed with the use of a five percent tungsten additive to the molybdenum to provide higher strength. That was followed by the introduction of the so-called dispersion-strengthened molybdenum alloy materials presently in use. One such high-strength material is that described in U.S. Pat. No. 4,195,247, issued on Mar. 25, 1980 and assigned to the assignee of the present invention. Another such material is that known as TZM (titanium, zirconium and molybdenum, as well as carbon) which is commercially available from Metallwerk Plansee Aktiengesellschaft.

The rotatable anode has traditionally been attached to the stem of an x-ray tube rotor by such means as a mechanical attachment, welding, or diffusion bonding. Since the stem is normally composed of a different material from that of the target, an adequate attachment by way of diffusion bonding is difficult to obtain. For example, a desirable material for use in the stem has been found to be columbium, because of its relative high strength and low thermal conductivity. While a columbium stem is compatible with both a pure molybdenum target and a molybdenum/tungstem target for purposes of diffusion bonding, it has been found to be relatively incompatible for diffusion bonding to the dispersion-strengthened molybdenum alloys.

It is therefore an object of the present invention to provide an improved means of attaching a molybdenum alloy x-ray anode to a stem of a different material.

Another object is to provide a means of diffusion bonding a molybdenum alloy anode to a stem composed of a different material.

Yet another object is to provide a diffusion-bonded anode which is economical to manufacture and effective in use.

These objects and other features and advantages become more readily apparent upon reference of the following description when taken in conjunction with the appended drawings.

SUMMARY OF THE INVENTION

Briefly, in accordance with one aspect of the invention, a molybdenum alloy anode is fabricated with a molybdenum insert disposed in its central core region to act as a transitional material between the alloy target and the stem composed of a different material. The insert is formed as an integral part of the target and is then dispersion bonded to the stem by way of a conventional process. The resulting target provides all of the advantages of the alloy material while allowing for easy attachment to the stem by the diffusion-bonding process.

In the drawing as hereinafter described, a preferred embodiment is depicted; however, various other modifications and alternate constructions can be made thereto without departing from the true spirit and scope of the invention.

BRIEF DESCRIPTION OF THE DRAWING

The drawing is a sectional view of a target as attached to the stem in accordance with a preferred embodiment of the invention.

DESCRIPTION OF THE PREFERRED EMBODIMENT

There is shown in the drawing, an anode assembly 10 of the type which is conventionally used in rotating anode x-ray tubes. The assembly 10 is attached to the stem 11 in a manner to be described more fully hereinafter.

The anode 10 is comprised of a dish-shaped body 12 having an axial bore 13 formed therein. On one face of the body 12 is a focal track 14 which is applied with conventional techniques for use in generating x-rays when bombarded by the electrons from a cathode during the operation of an x-ray tube. An integral insert or collar 16 is disposed within the bore 13 intermediate the body 12 and the stem 11 so as to facilitate the interconnection of the two elements.

The anode body 12 is composed of a high-strength, molybdenum alloy which is capable of withstanding routine operational temperatures in the vicinity of 1350° C. without incurring significant thermal creep and eventual warpage. Examples of such molybdenum alloy materials are mentioned hereinabove. Other examples of possible materials include those commonly known in the industry as TZC and MT104. TZC is similar to TZM mentioned above but with greater percentages of carbon added. MT104 is a metal which is commercially available from GTE Sylvania. All of the exemplary molybdenum alloys mentioned are commonly referred to as dispersion-strengthened materials. One of the characteristics they have in common is that they are not easily or effectively diffusion bonded to a dissimilar metal. This becomes a problem because of the desirability for diffusion bonding the body 12 to the stem 11. Because of the need for other performance characteristics, the stem 11 is not normally made of the same or similar material to that of the body 12. As mentioned, a material which has been found to be particularly suitable for use in the stem is columbium or an alloy thereof. These materials possess a relatively high strength while at the same time exhibiting a relatively low thermal conductivity, a characteristic which is desirable for inhibiting the conduct of heat to the bearings of the x-ray tube. Since the columbium is quite dissimilar to the alloy material of the body 12, diffusion bonding of the two materials is not normally adequate.

In accordance with the present invention, the insert 16 is interposed between the two materials to act as a transition structure, the insert 16 being composed of a material which is diffusion-bonding compatible to each of the adjoining materials. For that purpose, a pure molybdenum material has been found to be satisfactory, since it is compatible with both the dispersion-strengthened molybdenum alloys and the columbium material of the stem. Certain alloys of molybdenum would also be suitable for this purpose. For example, the alloy with five percent tungsten would be compatible with both the adjoining materials.

Fabrication of the anode with the insert is accomplished by a powdered metalurgical process similar to the present process of forming the anode entirely from a molybdenum alloy powder, the principal difference being that a pure molybdenum powder is now added to the composite. First, the powder mixture which is to become the tungsten rhenium focal track layer is placed in a compacting dye. The molybdenum and molybdenum alloy powders are then selectively placed in appropriate sections of the compacting die, with the alloy powder being disposed in an outer annulus and the pure molybdenum powder being disposed in an inner annulus. The outer and inner annuli are defined at their common boundary by a removable collar (not shown). The collar separating the molybdenum powder and the molybdenum alloy powder is then removed and the composite is pressed to form a green compact which is then sintered and hot forged. The result is an integral target structure with the pure molybdenum insert being integrally bonded to and forming a part of the anode structure. After further processing, such as forging, machining, and cleaning, the anode assembly is ready for attachment to the stem 11, by way of a diffusion bonding process which is accomplished in a conventional manner.

While the present invention has been disclosed with particular reference to a preferred embodiment, the concepts of this invention are readily adaptable to other embodiments. It will be recognized that those skilled in the art may vary the structure thereof without departing from the essential spirit of the present invention. For example, while the invention has been described in terms of use with particular materials, i.e., dispersion-strengthened molybdenum alloys used in combination with a pure alloy for attachment to a columbium stem, it will be understood that various other materials could be used while remaining within the scope of the appended claims.

What is claimed as new and desired to be secured by Letters Patent of the United States is:

1. An anode assembly for attachment to a rotatable stem of an x-ray tube comprising:

a body having a central cavity formed therein and having a focal track applied to one face thereof, said body being composed of a first material that is not susceptible to diffusion bonding with the stem; and a core disposed in said central cavity to form an integral part of said body, said core having a central bore formed therein for receiving the stem and being composed of a second material which is susceptible to diffusion bonding with the stem.

2. An anode as set forth in claim 1 wherein said first material is a high-strength molybdenum alloy.

3. An anode as set forth in claim 2 wherein said molybdenum alloy is of the dispersion-strengthened type.

4. An anode assembly as set forth in claim 1 wherein said second material consists essentially of molybdenum.

5. A rotary anode assembly for attachment to an axial stem comprising a disc having an outer annulus composed of a first material which is not compatible with said stem for purposes of diffusion bonding, and an inner annulus attached to said outer annulus and having a central opening for receiving the axial stem, said inner annulus being composed of a second material which is compatible with said stem for purposes of diffusion bonding.

6. A rotary anode assembly as set forth in claim 5 wherein said first material is comprised of a dispersion-strengthened, molybdenum alloy.

7. A rotary anode assembly as set forth in claim 5 wherein said second material is comprised of molybdenum.

8. A rotary x-ray tube anode assembly comprising an outer annulus composed of a first material of high-strength material and having a focal track attached to one surface thereof, and an inner annulus integrally attached to said outer annulus and having a central bore formed therein for receiving a rotatable stem, said inner annulus being composed of a second material which is susceptible to diffusion bonding to said stem.

9. In a rotary anode of the type having a disc formed of a molybdenum alloy material for attachment to the rotatable stem, an interface structure comprising an annular insert integrally attached to and forming a part of said disc, said insert being composed of a material consisting essentially of molybdenum.

* * * * *